United States Patent
Chiang et al.

(10) Patent No.: US 11,228,787 B2
(45) Date of Patent: Jan. 18, 2022

(54) SIGNALING MULTIPLE TRANSMISSION SELECTION

(71) Applicant: MediaTek Inc., Hsinchu (TW)

(72) Inventors: Man-Shu Chiang, Hsinchu (TW); Chih-Wei Hsu, Hsinchu (TW); Tzu-Der Chuang, Hsinchu (TW); Ching-Yeh Chen, Hsinchu (TW)

(73) Assignee: MediaTek Inc.

( * ) Notice: Subject to any disclaimer, the term of this patent is extended or adjusted under 35 U.S.C. 154(b) by 0 days.

(21) Appl. No.: 17/105,573

(22) Filed: Nov. 26, 2020

(65) Prior Publication Data

US 2021/0160541 A1    May 27, 2021

Related U.S. Application Data

(60) Provisional application No. 62/940,955, filed on Nov. 27, 2019.

(51) Int. Cl.
*H04N 19/176* (2014.01)
*H04N 19/625* (2014.01)

(52) U.S. Cl.
CPC ......... *H04N 19/625* (2014.11); *H04N 19/176* (2014.11)

(58) Field of Classification Search
CPC .. H04N 19/625; H04N 19/176; H04N 19/159; H04N 19/18; H04N 19/70; H04N 19/132; H04N 19/122
See application file for complete search history.

(56) References Cited

U.S. PATENT DOCUMENTS

| | | |
|---|---|---|
| 2004/0126028 A1 | 7/2004 | Adachi et al. |
| 2018/0288409 A1 | 10/2018 | Heo et al. |
| 2019/0313095 A1 | 10/2019 | Ikeda |
| 2020/0404276 A1* | 12/2020 | Nalci .................. H04N 19/91 |
| 2021/0058642 A1* | 2/2021 | Egilmez ............... H04N 19/176 |
| 2021/0092381 A1* | 3/2021 | Egilmez ............... H04N 19/129 |
| 2021/0092408 A1* | 3/2021 | Ramasubramonian ..................... H04N 19/61 |
| 2021/0099702 A1* | 4/2021 | Egilmez ............... H04N 19/122 |

(Continued)

OTHER PUBLICATIONS

"Recent advances in video coding beyond the HEVC standard" SIP (2019), vol. 8, , 2019.*

(Continued)

*Primary Examiner* — Frank F Huang
(74) *Attorney, Agent, or Firm* — Han IP PLLC; Andy M. Han

(57) ABSTRACT

A method for multiple transform selection (MTS) is provided. A video decoder receives data from a bitstream for a block of pixels to be decoded as a current block of a current picture of a video. The decoder sets a zero-out indication based on one or more non-zero coefficient indications of subblocks of the current block. When the zero-out indication indicates that a zero-out region has no non-zero coefficient, the decoder parses the bitstream for an MTS index. When the zero-out indication indicates that the zero-out region has at least one non-zero coefficient, the decoder sets the MTS index to a default value without parsing the MTS index from the bitstream. The decoder selects a transform mode according to the MTS index for the current block. The decoder reconstructs the current block by using the selected transform mode.

9 Claims, 10 Drawing Sheets

(56) References Cited

U.S. PATENT DOCUMENTS

2021/0160541 A1* 5/2021 Chiang ................ H04N 19/176
2021/0211729 A1* 7/2021 Koo ....................... H04N 19/70
2021/0235119 A1* 7/2021 Kim ..................... H04N 19/176

OTHER PUBLICATIONS

China National Intellectual Property Administration, International Search Report and Written Opinion for PCT/CN2020/132374, dated Feb. 26, 2021.
LG Electronics Inc., Non-CE6: LFNST simplification based on the methods proposed in CE6-2.1a, Joint Video Experts Team (JVET) of ITU-T SG 16 WP 3 and ISO/IEC JTC 1/SC 29/WG 11, JVET-O0209, Gothenburg, Sweden, dated Jul. 3-12, 2019.
Interdigital Communications, Inc., Non-CE6: interaction between MTS and LFNST, Joint Video Experts Team (JVET) of ITU-T SG 16 WP 3 and ISO/IEC JTC 1/SC 29/WG 11, JVET-O0466, Gothenburg, Sweden, Jul. 3-12, 2019.
Nokia, On MTS index signalling, Joint Video Experts Team (JVET) of ITU-T SG 16 WP 3 and ISO/IEC JTC 1/SC 29/WG 11, JVET-Q0055_v2, Brussels, Belgium, Jan. 7-17, 2020.

* cited by examiner subblock (4x4 coefficients) with xS ≤ 3 and yS ≤ 3 subblock (4x4 coefficients) in zero-out region with xS > 3 or yS > 3; coded_sub_block_flag checked to determine whether to signal/parse MTS index ism SIGNALING MULTIPLE TRANSMISSION SELECTION

CROSS REFERENCE TO RELATED PATENT APPLICATION(S)

The present disclosure is part of a non-provisional application that claims the priority benefit of U.S. Provisional Patent Application No. 62/940,955, filed on 27 Nov. 2019. Contents of above-listed applications are herein incorporated by reference.

TECHNICAL FIELD

The present disclosure relates generally to video coding. In particular, the present disclosure relates to methods of selecting multiple transform operations for encoding or decoding a block of pixels.

BACKGROUND

Unless otherwise indicated herein, approaches described in this section are not prior art to the claims listed below and are not admitted as prior art by inclusion in this section.

High-Efficiency Video Coding (HEVC) is an international video coding standard developed by the Joint Collaborative Team on Video Coding (JCT-VC). HEVC is based on the hybrid block-based motion-compensated DCT-like transform coding architecture. The basic unit for compression, termed coding unit (CU), is a 2N×2N square block, and each CU can be recursively split into four smaller CUs until the predefined minimum size is reached. Each CU contains one or multiple prediction units (PUs).

To achieve the best coding efficiency of hybrid coding architecture in HEVC, intra prediction and inter prediction can be used for each PU. For intra prediction modes, spatial neighboring reconstructed pixels can be used to generate the directional predictions. There are up to 35 directions in HEVC. For inter prediction modes, the temporal reconstructed reference frames can be used to generate motion compensated predictions. There are three different types of inter prediction modes, including Skip, Merge and Inter Advanced Motion Vector Prediction (AMVP) modes.

After prediction, the predicted residues for one CU are divided into transform units (TUs) and coded using transform and quantization. HEVC uses Discrete Cosine Transform type II (DCT-II) as its core transform (primary transform) because it has a strong energy compaction property. Discrete Sine Transform (DST) was also introduced to be used alternatively with DCT for oblique intra modes. For inter-predicted residue, DCT-II is the only transform used in current HEVC. Discrete Sine Transform type VII (DST-VII) and Discrete Cosine Transform type VIII (DCT-VIII) are also used in some cases.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

Some embodiments provide a method for multiple transform selection (MTS). A video decoder receives data from a bitstream for a block of pixels to be decoded as a current block of a current picture of a video. The decoder sets a zero-out indication based on non-zero coefficient indications of subblocks of the current block. When the zero-out indication indicates that the zero-out region has no non-zero coefficient, the decoder parses the bitstream for an MTS index. Or, when the zero-out indication indicates that the zero-out region has at least one non-zero coefficient, the decoder sets the MTS index to a default value without parsing the MTS index from the bitstream. The decoder selects a transform mode from multiple transform kernels according to the MTS index for the current block. The decoder reconstructs the current block by using the selected transform mode.

A transform mode specifies horizontal and vertical transforms of an associated luma transform blocks in the current block. When the current block refers to the coding block including one or more transform blocks, the zero-out region of the current block is a region of the current block defined as follows. In an example, the zero-out region is the region outside from the top-left 16×16 area of the current block. In another example, the zero-out region is defined by one or more subblock positions beyond a vertical threshold position or a horizontal threshold position. The horizontal threshold position and the vertical threshold position are positions (xS, yS) of coding groups in the current transform block (or named the subblock at location (xS, yS) within the current transform block). For example, the subblock includes 16 transform coefficients. In other words, the subblock includes 4×4 transform coefficients.

In some embodiments, the zero-out indication is further used to indicate whether the current block has one or more non-zero coefficients in the zero-out region of the current block. The zero-out region of the current block is a region of the current block defined by the subblock positions beyond a vertical threshold position or a horizontal threshold position. The zero-out indication is defined based on one or more non-zero coefficient indications of subblocks, used to indicate whether the subblocks of the current block, located at zero-out region of the current block, have one or more non-zero coefficients.

In some embodiments, the default value of the transform mode for MTS is Discrete Cosine Transform Type II (DCT-2) for both horizontal and vertical transforms. In some embodiments, the low-frequency non-separable transform (LFNST) is disabled for the current block when MTS is enabled. In some embodiments, MTS is disabled when LFNST is enabled.

BRIEF DESCRIPTION OF THE DRAWINGS

The accompanying drawings are included to provide a further understanding of the present disclosure, and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

DETAILED DESCRIPTION

Figure 1:
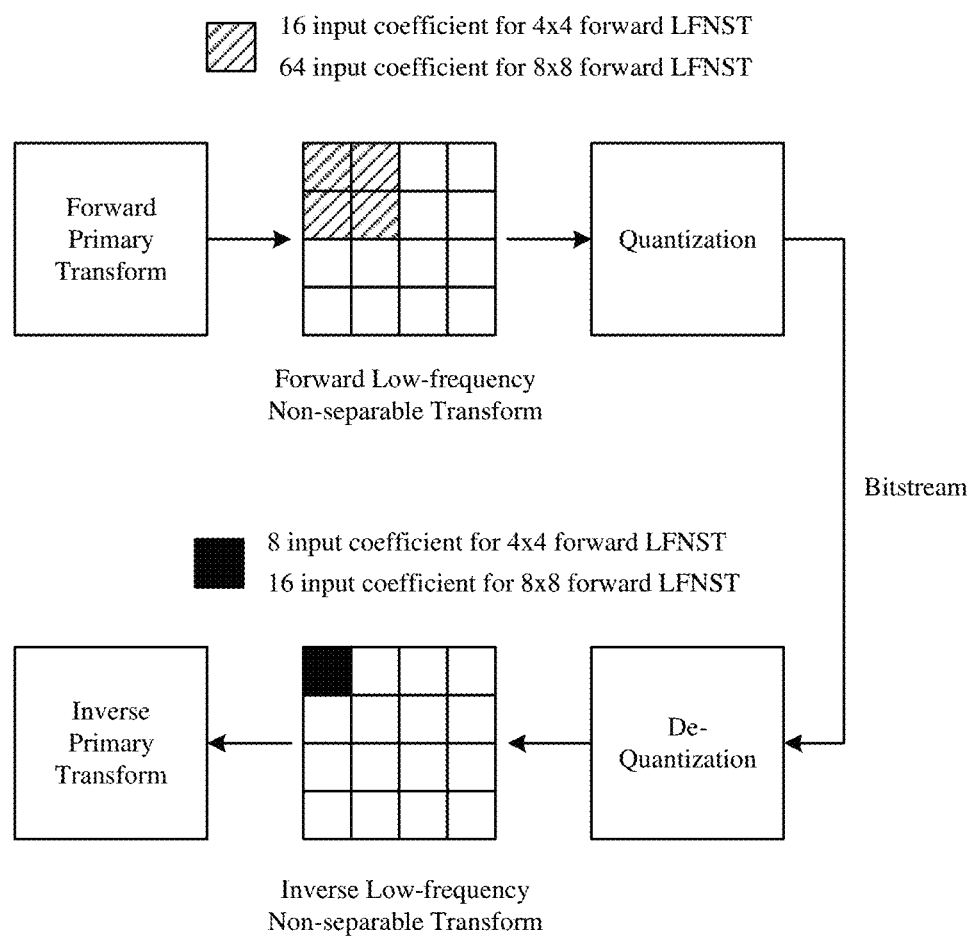
FIG. 1 illustrates Low-Frequency Non-Separable Transform (LFNST) process.

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

I. Multiple Transform Selection (MTS)

In order to improve pixel data compaction through transform, in some embodiments of the disclosure, Multiple transform selection (MTS) scheme is used for residual coding for intra and/or inter coded blocks. MTS scheme utilizes multiple selected transforms from the DCT/DST families, including a newly introduced transform DCT-8. Specifically, in some embodiments, MTS scheme is used for residual coding for inter and/or intra coded blocks in addition to DCT-II, for example, by using DCT-8 and/or DST-7. Table 1 below shows the basis functions of the selected DST/DCT.

TABLE 1

Transform basis functions of DCT-II/VIII and DSTVII for N-point input

| Transform Type | Basis function Ti(j), i, j = 0, 1, ..., N − 1 |
| --- | --- |
| DCT-II | $T_i(j) = \omega_0 \cdot \sqrt{\dfrac{2}{N}} \cdot \cos\left(\dfrac{\pi \cdot i \cdot (2j+1)}{2N}\right)$ <br> where, $\omega_0 = \begin{cases} \sqrt{\dfrac{2}{N}} & i = 0 \\ 1 & i \neq 0 \end{cases}$ |
| DCT-VIII | $T_i(j) = \sqrt{\dfrac{4}{2N+1}} \cdot \cos\left(\dfrac{\pi \cdot (2i+1) \cdot (2j+1)}{4N+2}\right)$ |
| DST-VII | $T_i(j) = \sqrt{\dfrac{4}{2N+1}} \cdot \sin\left(\dfrac{\pi \cdot (2i+1) \cdot (j+1)}{2N+1}\right)$ |

In order to keep the orthogonality of the transform matrix, the transform matrices are quantized more accurately than the transform matrices in HEVC. In some embodiments, to keep the intermediate values of the transformed coefficients within a 16-bit range, after horizontal and after vertical transform, all the coefficients are to have 10-bit.

In order to control MTS scheme, separate enabling flags are specified at SPS level for intra and inter, respectively. In some embodiments, when MTS is enabled at SPS, a CU level flag is signaled to indicate whether MTS is applied or not. Here, MTS is applied only for luma. The MTS CU level flag (mts_idx) can be signaled when both width and height are smaller than or equal to 32 and/or CBF flag for the current block (CU level) is equal to one. If MTS CU flag is equal to zero, then DCT-2 is applied in both directions (horizontal transform and vertical transform). However, if MTS CU flag is equal to one, then two other flags are additionally signaled to indicate the transform type for the horizontal and vertical directions, respectively. Transform and signaling mapping table based on the MTS CU flag as shown in Table 2.

TABLE 2

Mapping for Transforms in MTS scheme

| MTS_index | MTS_CU_flag | MTS_Hor_flag | MTS_Ver_flag | Intra/inter Horizontal | Vertical |
| --- | --- | --- | --- | --- | --- |
| 0 | 0 | | | DCT2 | |
| 1 | 1 | 0 | 0 | DST7 | DST7 |
| 2 | | 0 | 1 | DCT8 | DST7 |
| 3 | | 1 | 0 | DST7 | DCT8 |
| 4 | | 1 | 1 | DCT8 | DCT8 |

In the table, different combinations of MTS_CU_flag, MTS_Hor_flag, and MTS_Ver_flag are mapped to different values of a MTS index, which can be used to select a combination of horizontal and vertical transforms. For example, the MTS index equal to 0 indicates the DCT2 is used for both directions. For another example, the MTS index equal to 1 indicates the DST7 is used for both directions. For another example, the MTS index equal to 2 indicates the DCT8 is used for horizontal transform and DST7 is used for vertical transform. For another example, the MTS index equal to 3 indicates the DST7 is used for horizontal transform and DCT8 is used for vertical transform. For another example, the MTS index equal to 4 indicates the DCT8 is used for both directions.

In some embodiments, for transform matrix precision, 8-bit primary transform cores are used, and all HEVC transform cores are used, including 4-point DCT-2 and DST-7, 8-point, 16-point and 32-point DCT-2. Also, other transform cores, such as 64-point DCT-2, 4-point DCT-8, 8-point/16-point/32-point DST-7 and DCT-8, use 8-bit primary transform cores. In some embodiments, to reduce the complexity of large size DST-7 and DCT-8, High frequency transform coefficients are zeroed out for the DST-7 and DCT-8 blocks with size (width or height, or both width and height) equal to 32. Only the coefficients within the 16×16 lower-frequency region are used.

A. Low-Frequency Non-Separable Transform (LFNST)

In some embodiments, low-frequency non-separable transform (LFNST), which is known as reduced secondary transform, is applied between forward primary transform and quantization (at encoder) and between de-quantization and inverse primary transform (at decoder side). FIG. 1 illustrates Low-Frequency Non-Separable Transform (LFNST) process. In LFNST, 4×4 non-separable transform or 8×8 non-separable transform is applied according to block size. For example, 4×4 LFNST is applied for small blocks (i.e., min (width, height)<8) and 8×8 LFNST is applied for larger blocks (i.e., min (width, height)>4). Application of a non-separable transform, which is being used in LFNST, is described as follows using input as an example. To apply 4×4 LFNST, the 4×4 input block X $$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix}$$

is first represented as a vector $\vec{X}$:

$$\vec{X} = [X_{00} X_{01} X_{02} X_{03} X_{10} X_{11} X_{12} X_{13} X_{20} X_{21} X_{22} X_{23} X_{30} X_{31} X_{32} X_{33}]^T$$

The non-separable transform is calculated as $\vec{F} = T \cdot \vec{X}$, where $\vec{F}$ indicates the transform coefficient vector, and T is a 16×16 transform matrix. The 16×1 coefficient vector $\vec{F}$ is subsequently re-organized as 4×4 block using the scanning order for that block (horizontal, vertical or diagonal). The coefficients with smaller index will be placed with the smaller scanning index in the 4×4 coefficient block.

LFNST is based on direct matrix multiplication approach to apply non-separable transform so that it is implemented in a single pass without multiple iterations. The non-separable transform matrix dimension is reduced to minimize computational complexity and memory space to store the transform coefficients. Hence, reduced non-separable transform (or RST) method is used in LFNST. In some embodiments, reduced non-separable transform maps an N (N is commonly equal to 64 for 8×8 NSST) dimensional vector to an R dimensional vector in a different space, where N/R (R<N) is the reduction factor. Hence, instead of N×N matrix, RST matrix becomes an R×N matrix as follows:

$$T_{R \times N} = \begin{bmatrix} t_{11} & t_{12} & t_{13} & \cdots & t_{1N} \\ t_{21} & t_{22} & t_{23} & & t_{2N} \\ \vdots & & & \ddots & \vdots \\ t_{R1} & t_{R2} & t_{R3} & \cdots & t_{RN} \end{bmatrix}$$

where the R rows of the transform are R bases of the N dimensional space. The inverse transform matrix for RT is the transpose of its forward transform. For 8×8 LFNST, a reduction factor of 4 is applied, and 64×64 direct matrix, which is conventional 8×8 non-separable transform matrix size, is reduced to 16×48 direct matrix. Hence, the 48×16 inverse RST matrix is used at the decoder side to generate core (primary) transform coefficients in 8×8 top-left regions. When 16×48 matrices are applied instead of 16×64 with the same transform set configuration, each of which takes 48 input data from three 4×4 blocks in a top-left 8×8 block excluding right-bottom 4×4 block. With the help of the reduced dimension, memory usage for storing all LFNST matrices is reduced from 10 KB to 8 KB with reasonable performance drop.

In some embodiments, in order to reduce computation complexity, LFNST is applied only if all coefficients outside the first coefficient sub-group are non-significant. In other words, all primary-only transform coefficients are zero when LFNST is applied. This allows the LFNST index signaling to be conditioned upon the last-significant position, and hence avoids the extra coefficient scanning in LFNST design (which is otherwise needed for checking for significant coefficients at specific positions only.)

The worst-case handling of LFNST (in terms of multiplications per pixel) restricts the non-separable transforms for 4×4 and 8×8 blocks to 8×16 and 8×48 transforms, respectively. For these cases, in some embodiments, the last-significant scan position is constrained to be less than 8 when LFNST is applied, for other sizes less than 16. For blocks with a shape of 4×N and N×4 and N>8, the proposed restriction implies that the LFNST is applied only once, and only to the top-left 4×4 region. Since all primary-only coefficients are zero when LFNST is applied, the number of operations needed for the primary transforms is reduced in such cases. From an encoder's perspective, the quantization of coefficients is simplified when LFNST transforms are tested. A rate-distortion optimized quantization is done at maximum for the first 16 coefficients (in scan order), the remaining coefficients are forced to be zero.

In some embodiments, 4 transform sets and 2 non-separable transform matrices (kernels) per transform set are used in LFNST. The mapping from the intra prediction mode to the transform set is pre-defined as shown in Table 3:

TABLE 3

Transform Selection Table for LFNST

| IntraPredMode | Tr. set index |
|---|---|
| IntraPredMode < 0 | 1 |
| 0 <= IntraPredMode <= 1 | 0 |
| 2 <= IntraPredMode <= 12 | 1 |
| 13 <= IntraPredMode <= 23 | 2 |
| 24 <= IntraPredMode <= 44 | 3 |
| 45 <= IntraPredMode <= 55 | 2 |
| 56 <= IntraPredMode <= 80 | 1 |
| 81 <= IntraPredMode <= 83 | 0 |

If one of three CCLM modes (INTRA_LT_CCLM, INTRA_T_CCLM or INTRA_L_CCLM) is used for the current block (81<=predModeIntra<=83), transform set 0 is selected for the current chroma block. For each transform set, the selected non-separable secondary transform candidate is further specified by the explicitly signaled LFNST index. The index is signaled in a bitstream once per Intra CU after transform coefficients.

Since LFNST is restricted to be applicable only if all coefficients outside the first coefficient sub-group are non-significant, in some embodiments, LFNST index coding is dependent on the position of the last significant coefficient. In addition, the LFNST index is context coded but does not depend on intra prediction mode, and only the first bin is context coded. Furthermore, LFNST is applied for intra CU in both intra and inter slices, and for both Luma and Chroma. If a dual tree is enabled, LFNST indices for Luma and Chroma are signaled separately. For inter slice (the dual tree is disabled), a single LFNST index is signaled and used for both Luma and Chroma.

Considering that a large CU (e.g., greater than 64×64) is implicitly split (TU tiling) due to the existing maximum transform size restriction (64×64 or set with configuration), an LFNST index search could increase data buffering by four times for a certain number of decode pipeline stages. Therefore, the maximum allowed size for LFNST is 64×64 or maximum transform size. In some embodiments, MTS is enabled only when LFNST is off.

B. Signaling MTS Index

In some embodiments, MTS index specifies which transform kernels are applied along the horizontal and vertical direction of the associated luma transform blocks in the current block of pixels (e.g., CU). The MTS index is signaled at CU level following the syntax of LFNST (after signaling/parsing all transform blocks in the current block). The example of the corresponding CU syntax table is shown in Table 4.

TABLE 4

Coding Unit Syntax Table that includes MTS index

| | Descriptor |
|---|---|
| coding_unit ( x0, y0, cbWidth, cbHeight, cqtDepth, treeType, modeType ) {... | |
|   if( cu_cbf ) {... | |
|     LfnstDcOnly = 1 | |
|     LfnstZeroOutSigCoeffFlag = 1 | |
|     MtsZeroOutSigCoeffFlag = 1 | |
|     transform_tree( x0, y0, cbWidth, cbHeight, treeType, chType ) | |
|     lfnstWidth = ( treeType = = DUAL_TREE_CHROMA ) ? cbWidth / Sub WidthC : ( ( IntraSubPartitionsSplitType = = ISP_VER_SPLIT ) ? cbWidth / NumIntraSubPartitions : cbWidth ) | |
|     lfnstHeight = ( treeType = = DUAL_TREE_CHROMA ) ? cbHeight / SubHeightC : ( ( IntraSubPartitionsSplitType = = ISP_HOR_SPLIT) ? cbHeight / NumIntraSubPartitions : cbHeight ) | |
|     if( Min( lfnstWidth, lfnstHeight ) >= 4 && sps_lfnst_enabled_flag = = 1 && CuPredMode[ chType ][ x0 ][ y0 ] = = MODE_INTRA && ( !intra_mip_flag[ x0 ][ y0 ] \|\| Min( lfnstWidth, lfnstHeight ) >= 16 ) && Max( cbWidth, cbHeight ) <= MaxTbSizeY) { | |
|       if( ( IntraSubPartitionsSplitType != ISP_NO_SPLIT \|\| LfnstDcOnly = = 0 ) && LfnstZeroOutSigCoeffFlag = = 1 ) | |
|         lfnst_idx | ae(v) |
|     } | |
|     if( treeType != DUAL_TREE_CHROMA && lfnst_idx = = 0 && transform_skip_flag[ x0 ][ y0 ][ 0 ] = = 0 && Max( cbWidth, cbHeight ) <= 32 && IntraSubPartitionsSplit[ x0 ][ y0 ] = = ISP_NO_SPLIT && cu_sbt_flag = = 0 && MtsZeroOutSigCoeffFlag = = 1 && tu_cbf_luma[ x0 ][ y0 ] ) { | |
|       if( ( ( CuPredMode[ chType ][ x0 ][ y0 ] = = MODE_INTER && sps_explicit_mts_inter_enabled_flag ) \|\| ( CuPredMode[ chType ][ x0 ][ y0 ] = = MODE_INTRA && sps_explicit_mts_intra_enabled_flag ) ) ) | |
|         mts_idx | ae(v) |
|     } | |
|   } | |

The MTS signaling criteria is that if all of the following conditions are satisfied, MTS index is signaled; otherwise, MTS index is not signaled (and inferred to be 0 (the default value)).

Current CB is for luma
  Cbf of the current CB is larger than 0
  CB width is <=32 and CB height is <=32
  Current CU is not ISP (ISP has its own implicit selection rule for MTS)
  Current CU is not SBT (SBT has its own implicit selection rule for MTS)
  transform_skip_flag for the transform block in the current CB=0
  MtsZeroOutSigCoeffFlag=1 (initialized with 1 and updated for each TU/TB in the current CU/CB as shown in Table 5)

TABLE 5

Residual Coding Syntax Table

| | Descriptor |
|---|---|
| residual_coding( x0, y0, log2TbWidth, log2TbHeight, cIdx ) { | |
|   if( ( ( sps_mts_enabled_flag && cu_sbt_flag && log2TbWidth < 6 && log2TbHeight < 6 ) ) && cIdx = = 0 && log2TbWidth > 4 ) | |
|     log2ZoTbWidth = 4 | |
|   else | |
|     log2ZoTbWidth = Min( log2TbWidth, 5 ) | |
|   if( sps_mts_enabled_flag && cu_sbt_flag && log2TbWidth < 6 && log2TbHeight < 6 ) ) && cIdx = = 0 && log2TbHeight > 4 ) | |
|     log2ZoTbHeight = 4 | |
|   else | |
|     log2ZoTbHeight = Min( log2TbHeight, 5 ) ... | |
|   numSbCoeff = 1 << ( log2SbW + log2SbH ) | |
|   lastScanPos = numSbCoeff | |
|   lastSubBlock = ( 1 << ( log2TbWidth + log2TbHeight − ( log2SbW + log2SbH ) ) ) − 1 | |
|   do { | |
|     if( lastScanPos = = 0 ) { | |
|       lastScanPos = numSbCoeff | |
|       lastSubBlock− − | |
|     } | |
|     lastScanPos− − ... | |
|   } while( ( xC != LastSignificantCoeffX ) \|\| ( yC != LastSignificantCoeffY ) ) | |
|   if( lastSubBlock = = 0 && log2TbWidth >= 2 && log2TbHeight >= 2 && !transform_skip_flag[ x0 ][ y0 ][ cIdx ] && lastScanPos > 0 ) | |
|     LfnstDcOnly = 0 | |
|   if( ( lastSubBlock > 0 && log2TbWidth >= 2 && log2TbHeight >= 2 ) \|\| ( lastScanPos > 7 && ( log2TbWidth = = 2 \|\| log2TbWidth = = 3 ) && log2TbWidth = = log2TbHeight ) ) | |
|     LfnstZeroOutSigCoeffFlag = 0 | |
|   if( ( LastSignificantCoeffX > 15 \|\| LastSignificantCoeffY > 15 ) && cIdx = = 0 ) | |
|     MtsZeroOutSigCoeffFlag = 0 | |
|   QState = 0 | |
|   for( i = lastSubBlock; i >= 0; i− − ) { | |
|     startQStateSb = QState | |
|     xS = DiagScanOrder[ log2TbWidth − log2SbW ][ log2TbHeight − log2SbH ][ i ][ 0 ] | |
|     yS = DiagScanOrder[ log2TbWidth − log2SbW ][ log2TbHeight − log2SbH ][ i ][ 1 ] | |
|     inferSbDcSigCoeffFlag = 0 | |
|     if( i < lastSubBlock && i > 0 ) { | |
|       coded_sub_block_flag[ xS ][ yS ] | ae(v) |
|       inferSbDcSigCoeffFlag = 1 | |
|   }...} | |

Figure 2:
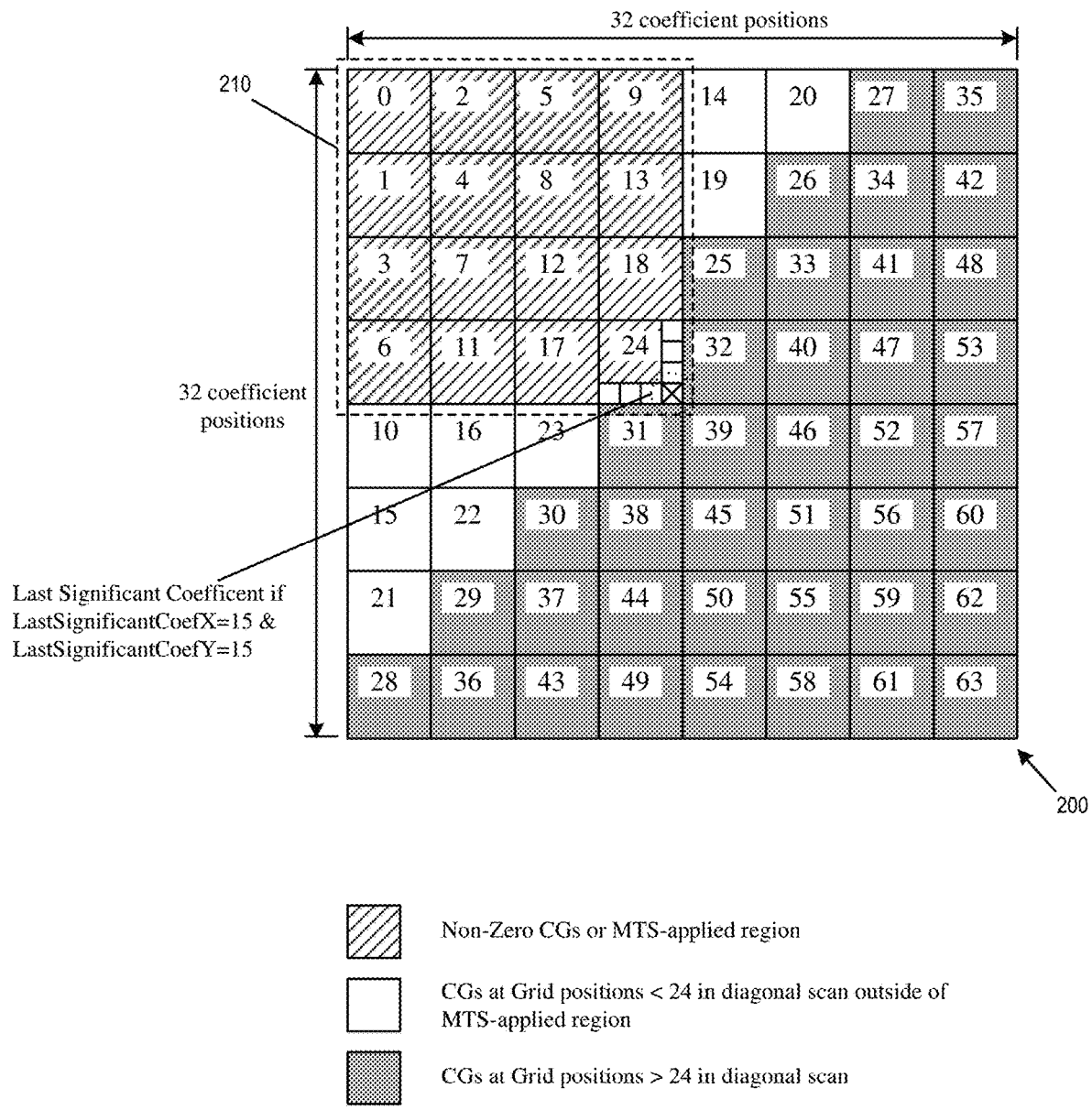
FIG. 2 illustrates a 32×32 transform block with zero and non-zero coefficients.

In some embodiments, when decoder receives the transformed coefficients for each TU/TB in the current CU/CB, for each TB (transform block), the decoder parses the last significant (non-zero) coefficient position first and then the syntax for each coding group (CG) or subblock (e.g., a CG=a 4×4 subblock). FIG. 2 illustrates a 32×32 transform block 200 with zero and non-zero coefficients. In the figure, each grid position represents one 4×4 CG and the number for each grid position represents the (diagonal) scanning order for each CG in the TB. The CGs are thusly located at grids numbered 0 through 63 in diagonal scanning order. In some embodiments, the syntax for each CG includes a significance flag (coded_sub_block_flag or sb_coded_flag) to indicate whether any non-zero coefficients are inside that CG, i.e., whether the coefficients of the subblock is coded. Specifically, sb_coded_flag[xS][yS] specifies the following for the subblock at location (xS, yS) within the current transform block, where a subblock is an array of transform coefficient levels:

When sb_coded_flag[xS][yS] is equal to 0, all transform coefficient levels of the subblock at location (xS, yS) are inferred to be equal to 0.

When sb_coded_flag[xS][yS] is not present, it is inferred to be equal to 1. For the subblock which the last significant coefficient position of the current TB is located, sb_coded_flag[xS][yS] is inferred to be 1.

In some embodiments, whether to parse MTS index or not depends on the syntax element MtsZeroOutSigCoeffFlag (1=parse MTS index for the TB/CU and 0=bypass MTS index for the TB/CU), which is initialized to 1 and updated for each luma TB in the current CU/CB. According to the syntax table shown in Table 5, if LastSignificantCoeffX>15 or LastSignificantCoeffY>15, the value of MtsZeroOutSigCoeffFlag is set to 0, and MTS index is bypassed (not signaled in the bitstream or not parsed form the bitstream). In the example of FIG. 2, if LastSignificantCoeffX>15 and LastSignificantCoeffY>15, the last significant coefficient is in the hashed region 210 (CGs at grid positions 0-9, 11-13, 17-18, and 24 in diagonal scan order). On the other hand, if LastSignificantCoeffX>15 or LastSignificantCoeffY>15, the last significant coefficient position for this TB is located at the darkened region (CGs at grids positions >24 in diagonal scan order), MtsZeroOutSigCoeffFlag is set to 0, and MTS index is bypassed.

However, there is redundancy between residual signaling and the MTS index if the video encoder/decoder relies only on LastSignificantCoeffX and/or LastSignificantCoeffY to determine whether to bypass MTS index for the current block. For example, for the 32×32 TB 200, since only the coefficients within the 16×16 lower-frequency region (the MTS-applied region 210, or CGs at grid positions 0-9, 11-13, 17-18, and 24) are retained for each MTS-applied TB, MTS index should be 0 if any non-zero-coefficient exists outside the 16×16 region. However, if only MtsZeroOutSigCoeffFlag, which is derived from the last significant coefficient position, is used, the redundancy occurs when the last significant coefficient position satisfies LastSignificantCoeffX<=15 and LastSignificantCoeffY<=15 (e.g. located at the CG at grid position 24), and some non-zero-coefficients may exist in the white region at grid positions 24 (CGs at grid positions 10, 14-16, and 19-23). In these circumstances, MtsZeroOutSigCoeffFlag would be set to 1 and MTS index is still parsed but always 0, which may be redundant.

In some embodiments of the disclosure, MTS index is parsed only when no coefficient exists outside of MTS-applied region (e.g., the region 210). The value of MtsZeroOutSigCoeffFlag is determined based on whether any non-zero coefficient exists outside MTS-applied region. If yes, MtsZeroOutSigCoeffFlag is set to 0 so that MTS index is not parsed and inferred to be 0. Otherwise MtsZeroOutSigCoeffFlag is set to 1 and if other MTS signaling conditions are satisfied, the MTS index is parsed from the bitstream and used for selecting MTS transform mode.

In some embodiments, the syntax element coded_sub_block_flag can be used to indicate if there is any non-zero coefficient for the subblocks or CGs outside the 16×16 region (the MTS-applied region). After the value of coded_sub_block_flag of a subblock or a CG is determined (parsed/inferred), MtsZeroOutSigCoeffFlag may be assigned according to the value of coded_sub_block_flag of the subblock. Specifically, if the coded_sub_block_flag of any subblock outside of the MTS-applied region is equal to 1, MtsZeroOutSigCoeffFlag is set to 0.

Specifically, for a subblock at location (xS, yS) within the current transform block, coded_sub_block_flag[xS][yS] specifies the following:

If coded_sub_block_flag[xS][yS] is not present, it is inferred to be equal to 1.

If coded_sub_block_flag[xS][yS] is equal to 0, the 16 transform coefficient levels of the subblock at location (xS, yS) are inferred to be equal to 0.

If coded_sub_block_flag[xS][yS] is equal to 1, the following applies:

If (xS, yS) is equal to (0, 0) and (LastSignificantCoeffX, LastSignificantCoeffY) is not equal to (0, 0), at least one of the 16 sig_coeff_flag syntax elements is present for the subblock at location (xS, yS).

Otherwise, at least one of the 16 transform coefficient levels of the subblock at location (xS, yS) has a non-zero value.

For example, when (xS≥4 or yS≥4) and coded_sub_block_flag [xS][yS]==true, MtsZeroOutSigCoeffFlag is set to 0. In some embodiments, a rule defined based on coded_sub_block_flag rather than the last significant coefficient position can be used to determine the value of MtsZeroOutSigCoeffFlag. A corresponding syntax table for residual coding is shown in Table 6 below.

TABLE 6 residual coding syntax table with coded_sub_block_flag used to determine the value of MtsZeroOutSigCoeffFlag Descriptor

```
residual_coding( x0, y0, log2TbWidth, log2TbHeight, cIdx ) {
    if( ( ( sps_mts_enabled_flag && cu_sbt_flag &&
            log2TbWidth < 6 && log2TbHeight < 6 ) )
            && cIdx = = 0 && log2TbWidth > 4 )
        log2ZoTbWidth = 4
    else
        log2ZoTbWidth = Min( log2TbWidth, 5 )
    if( ( sps_mts_enabled_flag && cu_sbt_flag &&
            log2TbWidth < 6 && log2TbHeight < 6 ) )
            && cIdx = = 0 && log2TbHeight > 4 )
        log2ZoTbHeight = 4
    else
        log2ZoTbHeight = Min( log2TbHeight, 5 ) ...
    numSbCoeff = 1 << ( log2SbW + log2SbH )
    lastScanPos = numSbCoeff
    lastSubBlock =
( 1 << ( log2TbWidth + log2TbHeight − ( log2SbW +
log2SbH ) ) ) − 1
    do {
        if( lastScanPos = = 0 ) {
            lastScanPos = numSbCoeff
            lastSubBlock− −
        }
        lastScanPos− − ...
    } while( ( xC != LastSignificantCoeffX ) || ( yC !=
LastSignificantCoeffY ) )
    if( lastSubBlock = = 0 && log2TbWidth >= 2 &&
log2TbHeight >= 2 &&
            !transform_skip_flag[ x0 ][ y0 ][ cIdx ] &&
lastScanPos > 0 )
        LfnstDcOnly = 0
    if( ( lastSubBlock > 0 && log2TbWidth >= 2 &&
log2TbHeight >= 2 ) ||
        ( lastScanPos > 7 && ( log2TbWidth == 2 ||
log2TbWidth = = 3 ) &&
```

TABLE 6-continued residual coding syntax table with coded_sub_block_flag used to determine the value of MtsZeroOutSigCoeffFlag

| | Descriptor |
|---|---|
| log2TbWidth = = log2TbHeight ) ) | |
|  LfnstZeroOutSigCoeffFlag = 0 | |
| QState = 0 | |
| for( i = lastSubBlock; i >= 0; i- - ) { | |
|  startQStateSb = QState | |
|  xS = | |
| DiagScanOrder[ log2TbWidth − log2SbW ] | |
| [ log2TbHeight − log2SbH ] | |
|      [ i ][ 0 ] | |
|  yS = | |
| DiagScanOrder[ log2TbWidth − log2SbW ] | |
| [ log2TbHeight − log2SbH ] | |
|      [ i ][ 1 ] | |
|  inferSbDcSigCoeffFlag = 0 | |
|  if( i < lastSubBlock && i > 0 ) { | |
|   coded_sub_block_flag[ xS ][ yS ] | ae(v) |
|   inferSbDcSigCoeffFlag = 1 | |
|  } | |
|  if( (xS >= 4 ‖ yS >= 4) && | |
| coded_sub_block_flag[ xS ][ yS ] && cIdx = = 0 ) | |
|   MtsZeroOutSigCoeffFlag = 0 | |
| ... } | |

According to Table 6, if any subblock or CG at horizontal or vertical position greater or equal to 4 (xS≥4 or yS≥4) has non-zero coefficients (indicated by coded_sub_block_flag [xS][yS]), MtsZeroOutSigCoeffFlag is set to 0, and MTS index parsing is bypassed. In another word, the corresponding syntax table can also be as follows.

| |
|---|
| if( sb_coded_flag[ xS ][ yS ] && ( xS > 3 ‖ yS > 3) && cIdx = = 0 ) |
|  MtsZeroOutSigCoeffFlag = 0 |

Figure 3:
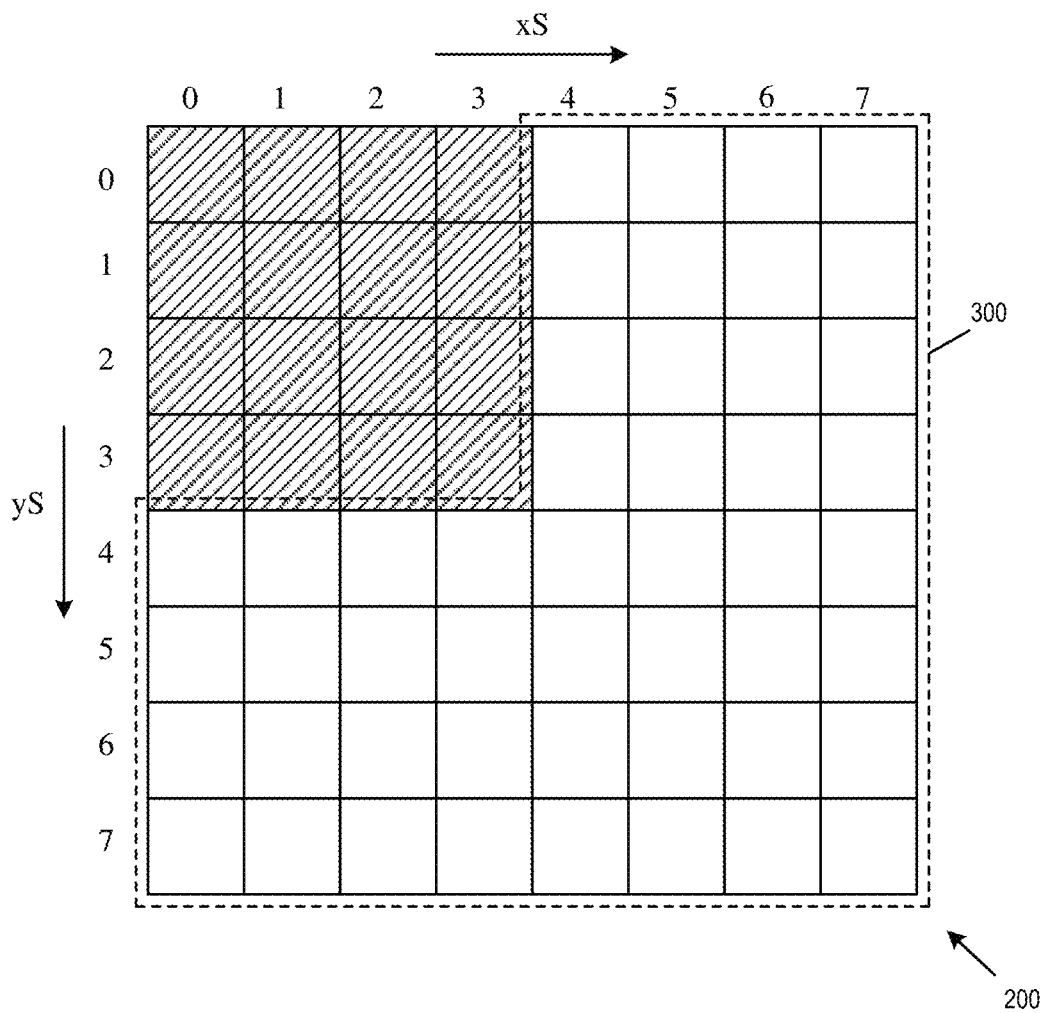
FIG. 3 illustrates using non-zero coefficient indications of subblocks to determine whether to parse Multiple Transform Selection (MTS) index.
Figure 3:
Figure 3:

FIG. 3 illustrates using non-zero coefficient indications of subblocks (coded_sub_block_flag) to determine whether to parse MTS index. As illustrated, subblocks at locations xS≤3 and yS≤3 of the block 200 (the MTS-applied region 210) can have non-zero coefficients while MTS index is parsed or signaled. However, if any subblock or CG located in a region 300 at location xS≥4 or yS≥4 has non-zero coefficients (indicated by coded_sub_block_flag[xS][yS]), MtsZeroOutSigCoeffFlag is set to 0, and MTS index parsing is bypassed. The region 300 of the current block in which xS>3 or yS>3 is therefore also referred to as the MTS zero-out region or the zero-out region of the current block.

In some embodiments, coded_sub_block_flag can be used together with last significant coefficient position to determine whether to parse MTS index. A corresponding syntax table for residual coding is shown in Table 7 below.

TABLE 7

| | Descriptor |
|---|---|
| residual_coding( x0, y0, log2TbWidth, log2TbHeight, cIdx ) { | |
|  if( ( ( sps_mts_enabled_flag && cu_sbt_flag && | |
|   log2TbWidth < 6 && log2TbHeight < 6 ) ) | |
|   && cIdx = = 0 && log2TbWidth > 4 ) | |
|   log2ZoTbWidth = 4 | |
|  else | |
|   log2ZoTbWidth = Min( log2TbWidth, 5 ) | |
|  if( sps_mts_enabled_flag && cu_sbt_flag && | |
|   log2TbWidth < 6 && log2TbHeight < 6 ) ) | |
|   && cIdx = = 0 && log2TbHeight > 4 ) | |
|   log2ZoTbHeight = 4 | |

TABLE 7-continued

| | Descriptor |
|---|---|
|  else | |
|   log2ZoTbHeight = Min( log2TbHeight, 5 ) ... | |
|  numSbCoeff = 1 << ( log2SbW + log2SbH ) | |
|  lastScanPos = numSbCoeff | |
|  lastSubBlock = | |
| ( 1 << ( log2TbWidth + log2TbHeight − ( log2SbW + log2SbH ) ) ) − 1 | |
|  do { | |
|   if( lastScanPos = = 0 ) { | |
|    lastScanPos = numSbCoeff | |
|    lastSubBlock- - | |
|   } | |
|   lastScanPos- - ... | |
|  } while( ( xC != LastSignificantCoeffX ) ‖ ( yC != LastSignificantCoeffY ) ) | |
|  if( lastSubBlock = = 0 && log2TbWidth >= 2 && log2TbHeight >= 2 && | |
|   !transform_skip_flag[ x0 ][ y0 ][ cIdx ] && lastScanPos > 0 ) | |
|   LfnstDcOnly = 0 | |
|  if( ( lastSubBlock > 0 && log2TbWidth >= 2 && log2TbHeight >= 2) ‖ | |
|   ( lastScanPos > 7 && ( log2TbWidth = = 2 ‖ log2TbWidth = = 3 ) && | |
|   log2TbWidth = = log2TbHeight ) ) | |
|   LfnstZeroOutSigCoeffFlag = 0 | |
|  if( ( LastSignificantCoeffX > 15 ‖ LastSignificantCoeffY > 15 ) && cIdx = = 0 ) | |
|   MtsZeroOutSigCoeffFlag = 0 | |
|  QState = 0 | |
|  for( i = lastSubBlock; i >= 0; i- - ) { | |
|   startQStateSb = QState | |
|   xS = | |
| DiagScanOrder[ log2TbWidth − log2SbW ] | |
| [ log2TbHeight − log2SbH ] | |
|      [ i ][ 0 ] | |
|   yS = | |
| DiagScanOrder[ log2TbWidth − log2SbW ] | |
| [ log2TbHeight − log2SbH ] | |
|      [ i ][ 1 ] | |
|   inferSbDcSigCoeffFlag = 0 | |
|   if( i < lastSubBlock && i > 0) { | |
|    coded_sub_block_flag[ xS ][ yS] | ae(v) |
|    inferSbDcSigCoeffFlag = 1 | |
|   } | |
|   if( (xS >= 4 ‖ yS >=4) && | |
| coded sub block flag[ xS ][ yS] && cIdx = = 0 ) | |
|    MtsZeroOutSigCoeffFlag = 0 | |
| ...} | |

In some embodiments, MtsZeroOutSigCoeffFlag is initially set (e.g., changed to 0 when MtsZeroOutSigCoeffFlag is not equal to 0) based on LastSignificantCoeffX and LastSignificantCoeffY, and the MtsZeroOutSigCoeffFlag is in turn used to determine whether to check the coded_sub_block_flag flag of the subblocks. A corresponding syntax table for residual coding is shown in Table 8 below.

TABLE 8

| | Descriptor |
|---|---|
| residual_coding( x0, y0, log2TbWidth, log2TbHeight, cIdx ) { | |
|  if( ( ( sps_mts_enabled_flag && cu_sbt_flag && | |
|   log2TbWidth < 6 && log2TbHeight < 6 ) ) | |
|   && cIdx = = 0 && log2TbWidth > 4 ) | |
|   log2ZoTbWidth = 4 | |
|  else | |
|   log2ZoTbWidth = Min( log2TbWidth, 5 ) | |

TABLE 8-continued

| | Descriptor |
|---|---|
| ```
if( ( sps_mts_enabled_flag && cu_sbt_flag &&
        log2TbWidth < 6 && log2TbHeight < 6 ) )
        && cIdx = = 0 && log2TbHeight > 4)
    log2ZoTbHeight = 4
else
    log2ZoTbHeight = Min( log2TbHeight, 5 ) ...
numSbCoeff = 1 << ( log2SbW + log2SbH )
lastScanPos = numSbCoeff
lastSubBlock =
( 1 << ( log2TbWidth + log2TbHeight − ( log2SbW +
log2SbH ) ) ) − 1
do {
    if( lastScanPos = = 0 ) {
        lastScanPos = numSbCoeff
        lastSubBlock− −
    }
    lastScanPos− − ...
} while( ( xC != LastSignificantCoeffX ) || ( yC !=
LastSignificantCoeffY ) )
    if( lastSubBlock = = 0 && log2TbWidth >= 2 &&
log2TbHeight >= 2 &&
        !transform_skip_flag[ x0 ][ y0 ][ cIdx ] &&
lastScanPos > 0 )
        LfnstDcOnly = 0
    if( ( lastSubBlock > 0 && log2TbWidth >= 2 &&
log2TbHeight >= 2 ) ||
        ( lastScanPos > 7 && ( log2TbWidth = = 2 ||
log2TbWidth = = 3 ) &&
        log2TbWidth = = log2TbHeight ) )
        LfnstZeroOutSigCoeffFlag = 0
    if( ( LastSignificantCoeffX > 15 ||
LastSignificantCoeffY > 15 ) && cIdx = = 0 )
        MtsZeroOutSigCoeffFlag = 0
QState = 0
for( i = lastSubBlock; i >= 0; i− − ) {
    startQStateSb = QState
    xS =
DiagScanOrder[ log2TbWidth − log2SbW ][ log2TbHeight −
log2SbH ]
                    [ i ][ 0 ]
    yS =
DiagScanOrder[ log2TbWidth − log2SbW ][ log2TbHeight −
log2SbH ]
                    [ i ][ 1 ]
    inferSbDcSigCoeffFlag = 0
    if( i < lastSubBlock && i > 0 ) {
        coded sub block flag[ xS ][ yS ]
        inferSbDcSigCoeffFlag = 1
    }
        if( MtsZeroOutSigCoeffFlag != 0 && (xS >= 4 ||
yS >=4) && coded_sub_block_flag[ xS ][ yS ] && cIdx = =
0 )
        MtsZeroOutSigCoeffFlag = 0
...}
``` | ae(v) |

Another example corresponding syntax table for residual coding is shown in Table 9 below.

TABLE 9

| | Descriptor |
|---|---|
| ```
residual_coding( x0, y0, log2TbWidth, log2TbHeight, cIdx ) }
    if( ( ( sps_mts_enabled_flag && cu_sbt_flag &&
            log2TbWidth < 6 && log2TbHeight < 6 ) )
            && cIdx = = 0 && log2TbWidth > 4 )
        log2ZoTbWidth = 4
    else
        log2ZoTbWidth = Min( log2TbWidth, 5 )
    if( ( sps_mts_enabled_flag && cu_sbt_flag &&
            log2TbWidth < 6 && log2TbHeight < 6 ) )
            && cIdx = = 0 && log2TbHeight > 4 )
        log2ZoTbHeight = 4
``` | |

TABLE 9-continued

| | Descriptor |
|---|---|
| ```
    else
        log2ZoTbHeight = Min( log2TbHeight, 5 ) ...
    numSbCoeff = 1 << ( log2SbW + log2SbH )
    lastScanPos = numSbCoeff
    lastSubBlock =
( 1 << ( log2TbWidth + log2TbHeight − ( log2SbW +
log2SbH ) ) ) − 1
    do {
        if( lastScanPos = = 0 ) {
            lastScanPos = numSbCoeff
            lastSubBlock− −
        }
        lastScanPos− − ...
    } while( ( xC != LastSignificantCoeffX ) || ( yC !=
LastSignificantCoeffY ) )
        if( lastSubBlock = = 0 && log2TbWidth >= 2 &&
log2TbHeight >= 2 &&
            !transform_skip_flag[ x0 ][ y0 ][ cIdx ] &&
lastScanPos > 0 )
            LfnstDcOnly = 0
        if( ( lastSubBlock > 0 && log2TbWidth >= 2 &&
log2TbHeight >= 2 ) ||
            ( lastScanPos > 7 && ( log2TbWidth = = 2 ||
log2TbWidth = = 3 ) &&
            log2TbWidth = = log2TbHeight ) )
            LfnstZeroOutSigCoeffFlag = 0
    QState = 0
    for( i = lastSubBlock; i >= 0; i− − ) {
        startQStateSb = QState
        xS =
DiagScanOrder[ log2TbWidth − log2SbW ][ log2TbHeight −
log2SbH ]
                        [ i ][ 0 ]
        yS =
DiagScanOrder[ log2TbWidth − log2SbW ][ log2TbHeight −
log2SbH ]
                        [ i ][ 1 ]
        inferSbDcSigCoeffFlag = 0
        if( i < lastSubBlock && i > 0 ) {
            coded sub block flag[ xS ][ yS ]
            inferSbDcSigCoeffFlag = 1
        }
            if( MtsZeroOutSigCoeffFlag != 0 && (xS >= 4 ||
yS >= 4) && coded_sub_block_flag[ xS ][ yS ] &&
cIdx = = 0 )
            MtsZeroOutSigCoeffFlag = 0
...}
``` | ae(v) |

Any above-proposed methods can be combined. Any variances of above can be implicitly decided with the block width or block height or block area, or explicitly decided by a flag signaled at CU, CTU, slice, tile, tile group, SPS, or PPS level. "Block" in this invention can means TU/TB/CU/CB/PU/PB. Any of the foregoing proposed methods can be implemented in encoders and/or decoders. For example, any of the proposed methods can be implemented in an inter/intra/transform coding module of an encoder, a motion compensation module, a merge candidate derivation module of a decoder. Alternatively, any of the proposed methods can be implemented as a circuit coupled to the inter/intra/transform coding module of an encoder and/or motion compensation module, a merge candidate derivation module of the decoder.

II. Example Video Encoder

Figure 4:
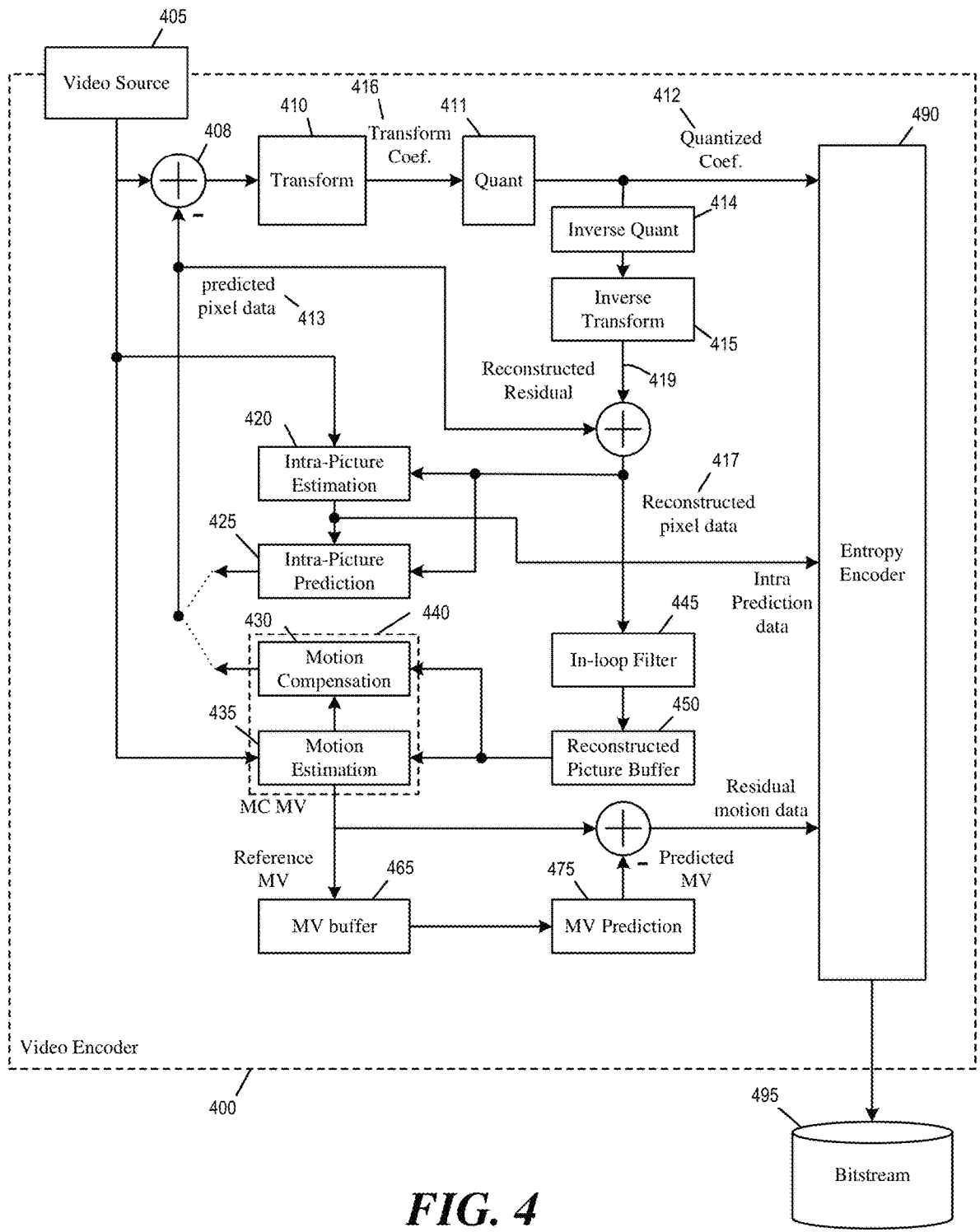
FIG. 4 illustrates an example video encoder.

FIG. 4 illustrates an example video encoder 400. As illustrated, the video encoder 400 receives input video signal from a video source 405 and encodes the signal into bitstream 495. The video encoder 400 has several components or modules for encoding the signal from the video source 405, at least including some components selected from a transform module 410, a quantization module 411, an inverse quantization module 414, an inverse transform module 415, an intra-picture estimation module 420, an intra-prediction module 425, a motion compensation module 430, a motion estimation module 435, an in-loop filter 445, a reconstructed picture buffer 450, a MV buffer 465, and a MV prediction module 475, and an entropy encoder 490. The motion compensation module 430 and the motion estimation module 435 are part of an inter-prediction module 440.

In some embodiments, the modules 410-490 are modules of software instructions being executed by one or more processing units (e.g., a processor) of a computing device or electronic apparatus. In some embodiments, the modules 410-490 are modules of hardware circuits implemented by one or more integrated circuits (ICs) of an electronic apparatus. Though the modules 410-490 are illustrated as being separate modules, some of the modules can be combined into a single module.

The video source 405 provides a raw video signal that presents pixel data of each video frame without compression. A subtractor 408 computes the difference between the raw video pixel data of the video source 405 and the predicted pixel data 413 from the motion compensation module 430 or intra-prediction module 425. The transform module 410 converts the difference (or the residual pixel data or residual signal 409) into transform coefficients (e.g., by performing Discrete Cosine Transform, or DCT). The quantization module 411 quantizes the transform coefficients into quantized data (or quantized coefficients) 412, which is encoded into the bitstream 495 by the entropy encoder 490.

The inverse quantization module 414 de-quantizes the quantized data (or quantized coefficients) 412 to obtain transform coefficients, and the inverse transform module 415 performs inverse transform on the transform coefficients to produce reconstructed residual 419. The reconstructed residual 419 is added with the predicted pixel data 413 to produce reconstructed pixel data 417. In some embodiments, the reconstructed pixel data 417 is temporarily stored in a line buffer (not illustrated) for intra-picture prediction and spatial MV prediction. The reconstructed pixels are filtered by the in-loop filter 445 and stored in the reconstructed picture buffer 450. In some embodiments, the reconstructed picture buffer 450 is a storage external to the video encoder 400. In some embodiments, the reconstructed picture buffer 450 is a storage internal to the video encoder 400.

The intra-picture estimation module 420 performs intra-prediction based on the reconstructed pixel data 417 to produce intra prediction data. The intra-prediction data is provided to the entropy encoder 490 to be encoded into bitstream 495. The intra-prediction data is also used by the intra-prediction module 425 to produce the predicted pixel data 413.

The motion estimation module 435 performs inter-prediction by producing MVs to reference pixel data of previously decoded frames stored in the reconstructed picture buffer 450. These MVs are provided to the motion compensation module 430 to produce predicted pixel data.

Instead of encoding the complete actual MVs in the bitstream, the video encoder 400 uses MV prediction to generate predicted MVs, and the difference between the MVs used for motion compensation and the predicted MVs is encoded as residual motion data and stored in the bitstream 495.

The MV prediction module 475 generates the predicted MVs based on reference MVs that were generated for encoding previously video frames, i.e., the motion compensation MVs that were used to perform motion compensation. The MV prediction module 475 retrieves reference MVs from previous video frames from the MV buffer 465. The video encoder 400 stores the MVs generated for the current video frame in the MV buffer 465 as reference MVs for generating predicted MVs.

The MV prediction module 475 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 495 by the entropy encoder 490.

The entropy encoder 490 encodes various parameters and data into the bitstream 495 by using entropy-coding techniques such as context-adaptive binary arithmetic coding (CABAC) or Huffman encoding. The entropy encoder 490 encodes various header elements, flags, along with the quantized transform coefficients 412, and the residual motion data as syntax elements into the bitstream 495. The bitstream 495 is in turn stored in a storage device or transmitted to a decoder over a communications medium such as a network.

The in-loop filter 445 performs filtering or smoothing operations on the reconstructed pixel data 417 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 5:
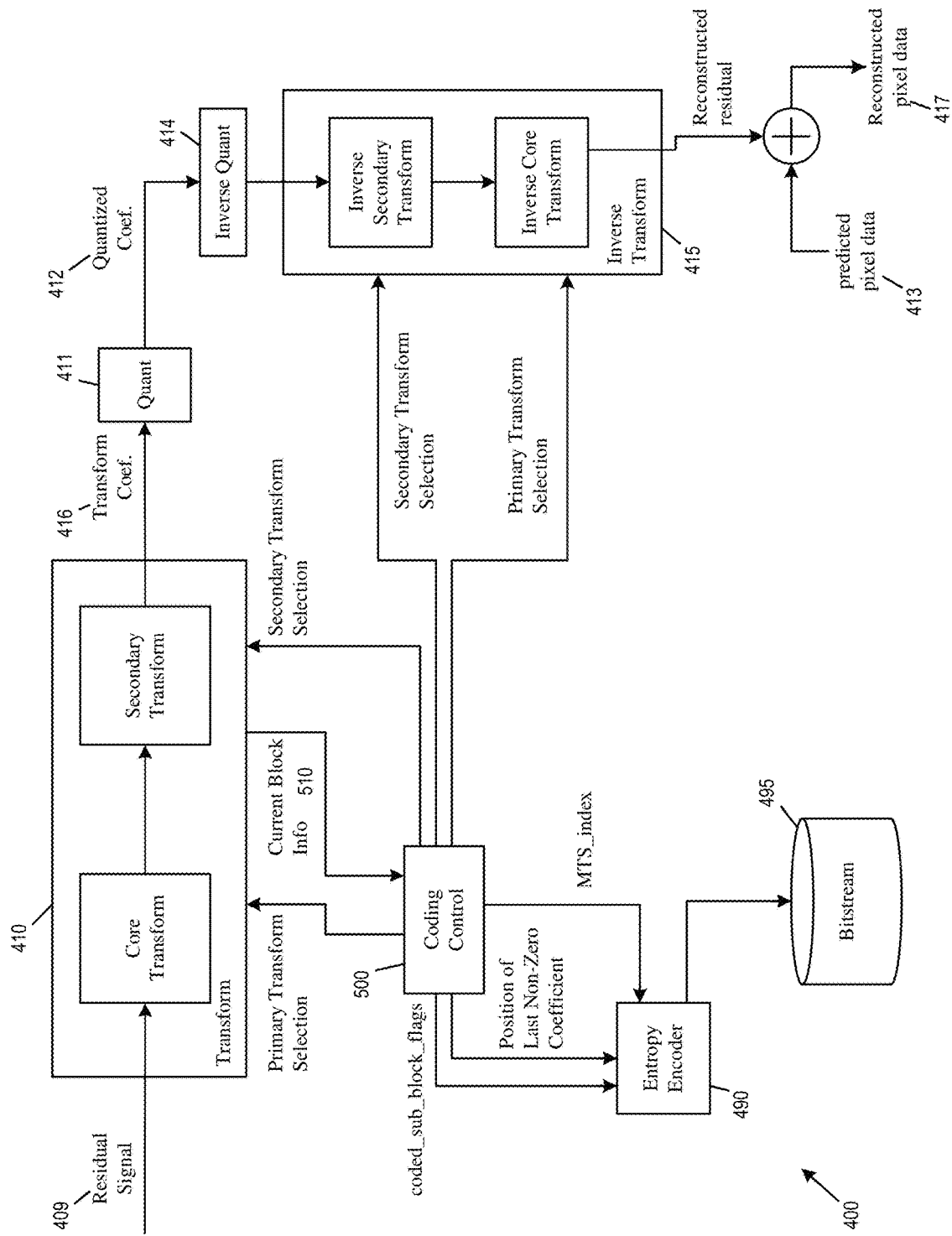
FIG. 5 illustrates portions of the encoder that implement MTS by selectively enabling transform operations.

FIG. 5 illustrates portions of the encoder 400 that implement multiple transform selection (MTS) by selectively enabling transform operations. As illustrated, for each block of pixels, the encoder 400 determines whether to perform a particular type of secondary transform (e.g., LFNST), whether to perform a particular type of primary transform (e.g., DCT-II), whether to enable MTS, and/or which transforms to use as horizontal transform and vertical transform for MTS. The encoder also determines the signaling for MTS in the bitstream 495.

As illustrated, the transform module 410 performs primary transform and/or secondary transform on the residual signal 409, and the inverse transform module 415 performs corresponding inverse primary transform and/or inverse secondary transform. The encoder 400 selects a primary transform and/or a secondary transform for the transform module 410 and the inverse transform module 415. The selected primary transform may implement MTS by including a horizontal transform and a vertical transform.

The encoder 400 includes a coding control module 500. The coding control module 500 determines the selection of the primary transform and/or the secondary transform, and if MTS is to be used, which transforms are to be used as horizontal and vertical transforms. The coding control module 500 may make this decision based on a set of current block information 510 from the transform module 409, which may indicate which subblocks of the current block has non-zero coefficients (or significant coefficients greater than a threshold.)

Based on the current block information 510, the coding control module 500 produces corresponding non-zero coefficient indications for the subblocks of the current block to indicate which subblocks have at least one non-zero coefficient (e.g., coded_sub_block_flag). The coding control module 500 may also identify the position of the last non-zero coefficient in the current block. The coding control module 500 may also generate an MTS index that identifies the horizontal transform and vertical transform being used for MTS. These signals are provided to the entropy encoder 490 to be included in the bitstream 495.

The entropy encoder 490 in turn encode the non-zero coefficient indications of the different subblocks into the bitstream (e.g., as coded_sub_block_flag of different subblocks). The entropy encoder 490 may also signal the position of the last non-zero coefficient (e.g., LastSignificantCoeffX and LastSignficantCoeffY) and the MTS index into the bitstream 495. In some embodiments, the entropy encoder 490 may skip or bypass signaling the MTS index in the bitstream if the non-zero coefficient indications indicate that there are non-zero coefficients in a zero-out region defined by subblock positions beyond a vertical threshold position or a horizontal threshold position (e.g., zero-out region 300 of FIG. 3 defined by xS>3 or yS>3), or if the position of the last non-zero coefficient in the current block indicates that there is a non-zero coefficient beyond a particular subblock in diagonal scan order (e.g., LastSignificantCoeffX>15 or LastSignificantCoeffY>15).

Figure 6:
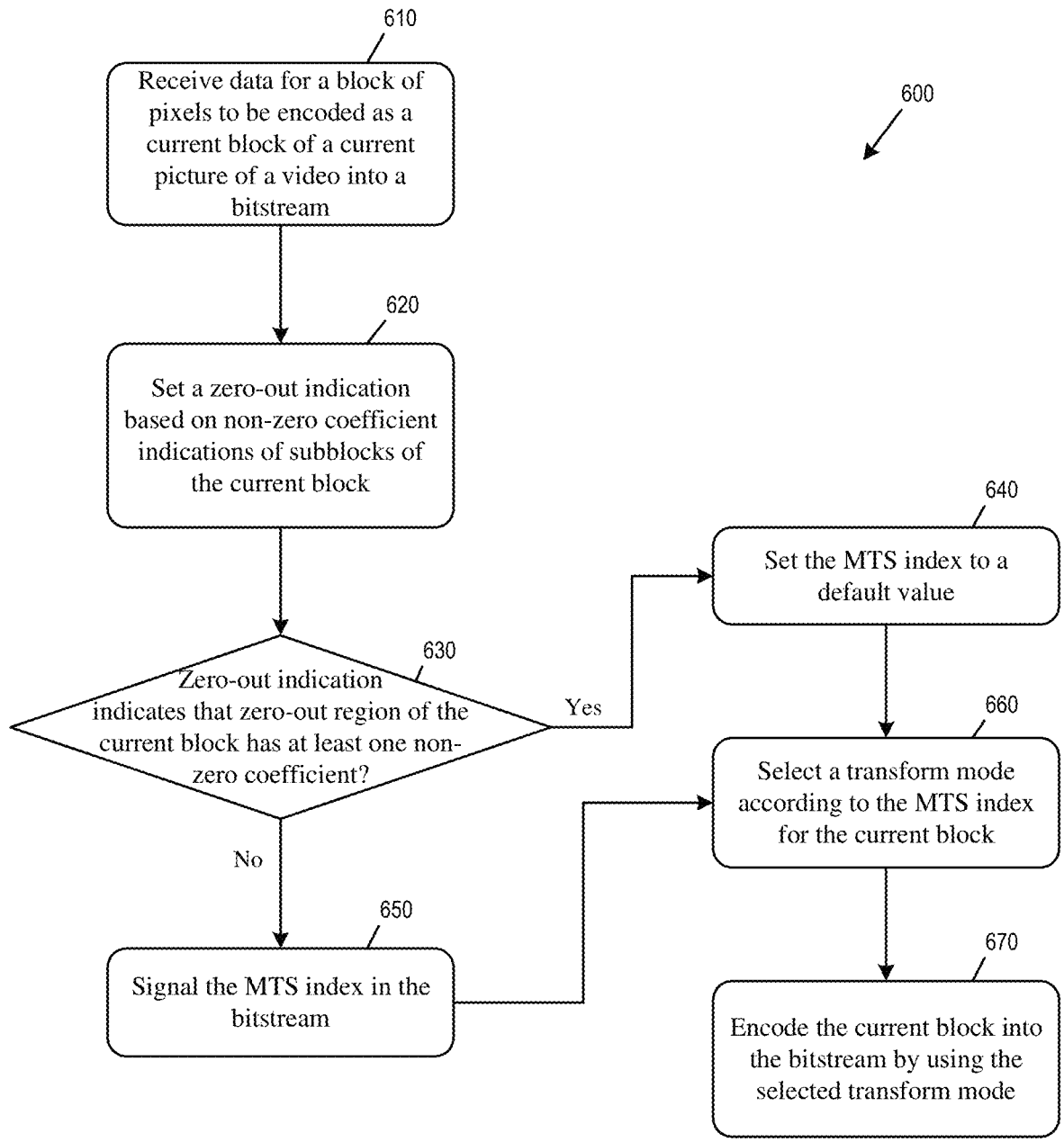
FIG. 6 conceptually illustrates a process for using multiple transform selection to encode a block of pixels.

FIG. 6 conceptually illustrates a process 600 for using multiple transform selection to encode a block of pixels. In some embodiments, one or more processing units (e.g., a processor) of a computing device implements the encoder 400 performs the process 600 by executing instructions stored in a computer readable medium. In some embodiments, an electronic apparatus implementing the encoder 400 performs the process 600.

The encoder receives (at block 610) data for a block of pixels to be encoded as a current block of a current picture of a video into a bitstream.

The encoder sets (at block 620) the zero-out indication (e.g., MtsZeroOutSigCoeffFlag) based on non-zero coefficient indications of subblocks (e.g., coded_sub_block_flag) of the current block (e.g., zero-out region 300 of FIG. 3 defined by xS>3 or yS>3). In some embodiments, the zero-out region of the current block is a region of each transform block in the current block that is beyond a vertical threshold position or a horizontal threshold position (e.g., xS>3 or yS>3). (The horizontal threshold position and the vertical threshold position are positions of coding groups that each may include 16 transform coefficients.) In some embodiments, the encoder examines the non-zero coefficient indications of the subblocks in the zero-out region to see if any subblocks in the zero-out region has non-zero coefficient. If so, the encoder sets the zero-out indication to indicate there is a non-zero coefficient in the zero-out region. The process proceeds to 640.

The encoder determines (at block 630) whether the zero-out indication indicates that the zero-out region of the current block has at least one non-zero coefficient. If so, the process proceeds to 640. If the zero-out indication indicate that the zero-out region has no non-zero coefficient, the encoder signals (at block 650) the MTS index into the bitstream, and the process then proceeds to 660.

At block 640, the encoder sets the MTS index to a default value without parsing the MTS index from the bitstream. The encoder selects (at block 660) a transform mode according to the MTS index for the current block. In some embodiments, the transform mode specifies horizontal and vertical transforms of an associated luma transform blocks in the current block. In some embodiments, the default value of the MTS index correspond to a transform mode that uses Discrete Cosine Transform Type II (DCT-2) for both horizontal and vertical transforms. The encoder encodes (at block 670) the current block into the bitstream by using the selected transform mode.

III. Example Video Decoder

Figure 7:
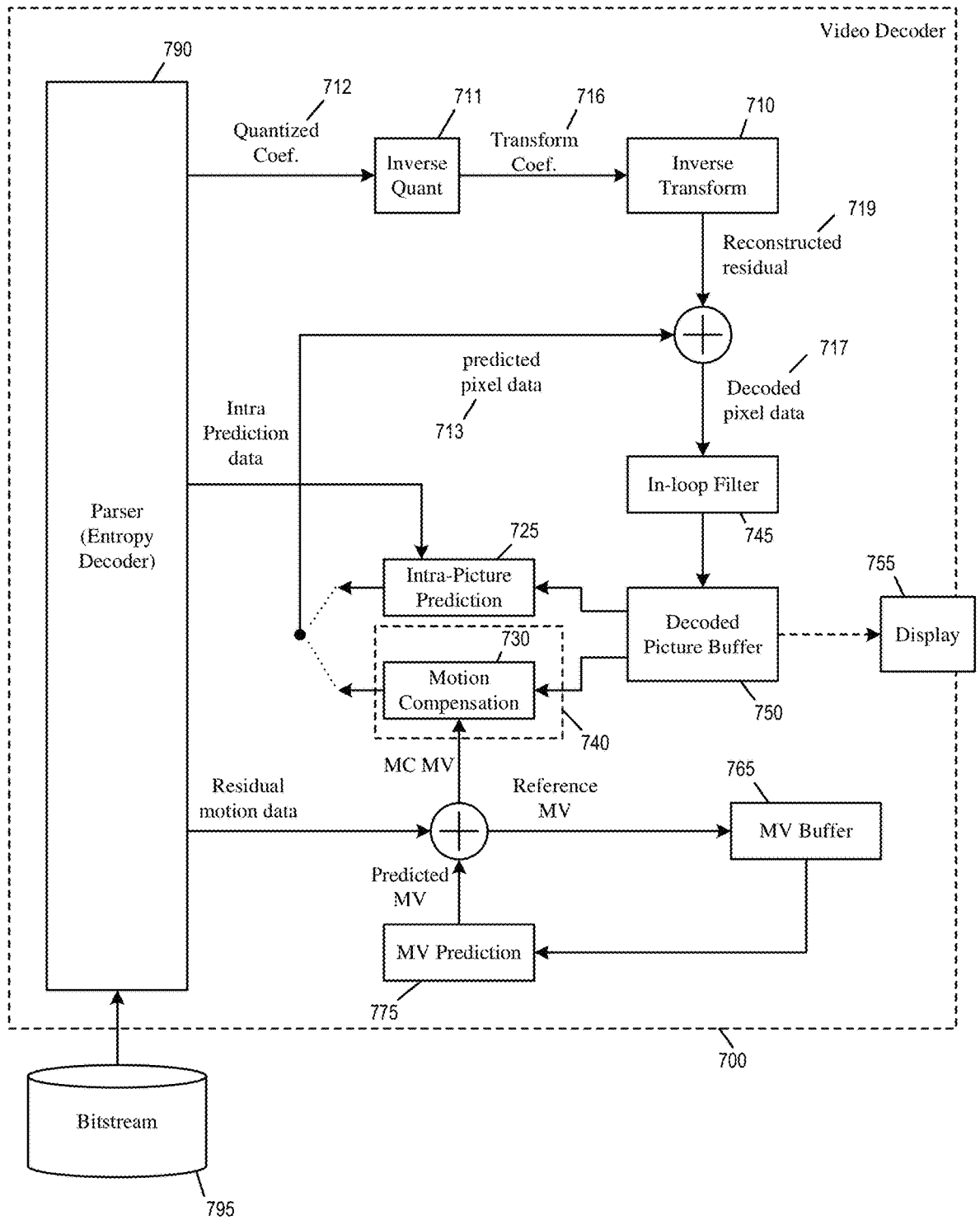
FIG. 7 illustrates an example video decoder.

FIG. 7 illustrates an example video decoder 700. As illustrated, the video decoder 700 is an image-decoding or video-decoding circuit that receives a bitstream 795 and decodes the content of the bitstream into pixel data of video frames for display. The video decoder 700 has several components or modules for decoding the bitstream 795, including some components selected from an inverse quantization module 711, an inverse transform module 710, an intra-prediction module 725, a motion compensation module 730, an in-loop filter 745, a decoded picture buffer 750, a MV buffer 765, a MV prediction module 775, and a parser 790. The motion compensation module 730 is part of an inter-prediction module 740.

In some embodiments, the modules 710-790 are modules of software instructions being executed by one or more processing units (e.g., a processor) of a computing device. In some embodiments, the modules 710-790 are modules of hardware circuits implemented by one or more ICs of an electronic apparatus. Though the modules 710-790 are illustrated as being separate modules, some of the modules can be combined into a single module.

The parser 790 (or entropy decoder) receives the bitstream 795 and performs initial parsing according to the syntax defined by a video-coding or image-coding standard. The parsed syntax element includes various header elements, flags, as well as quantized data (or quantized coefficients) 712. The parser 790 parses out the various syntax elements by using entropy-coding techniques such as context-adaptive binary arithmetic coding (CABAC) or Huffman encoding.

The inverse quantization module 711 de-quantizes the quantized data (or quantized coefficients) 712 to obtain transform coefficients, and the inverse transform module 710 performs inverse transform on the transform coefficients 716 to produce reconstructed residual signal 719. The reconstructed residual signal 719 is added with predicted pixel data 713 from the intra-prediction module 725 or the motion compensation module 730 to produce decoded pixel data 717. The decoded pixels data are filtered by the in-loop filter 745 and stored in the decoded picture buffer 750. In some embodiments, the decoded picture buffer 750 is a storage external to the video decoder 700. In some embodiments, the decoded picture buffer 750 is a storage internal to the video decoder 700.

The intra-prediction module 725 receives intra-prediction data from bitstream 795 and according to which, produces the predicted pixel data 713 from the decoded pixel data 717 stored in the decoded picture buffer 750. In some embodiments, the decoded pixel data 717 is also stored in a line buffer (not illustrated) for intra-picture prediction and spatial MV prediction.

In some embodiments, the content of the decoded picture buffer 750 is used for display. A display device 755 either retrieves the content of the decoded picture buffer 750 for display directly, or retrieves the content of the decoded picture buffer to a display buffer. In some embodiments, the display device receives pixel values from the decoded picture buffer 750 through a pixel transport.

The motion compensation module 730 produces predicted pixel data 713 from the decoded pixel data 717 stored in the decoded picture buffer 750 according to motion compensation MVs (MC MVs). These motion compensation MVs are decoded by adding the residual motion data received from the bitstream 795 with predicted MVs received from the MV prediction module 775.

The MV prediction module 775 generates the predicted MVs based on reference MVs that were generated for decoding previous video frames, e.g., the motion compensation MVs that were used to perform motion compensation. The MV prediction module 775 retrieves the reference MVs of previous video frames from the MV buffer 765. The video decoder 700 stores the motion compensation MVs generated for decoding the current video frame in the MV buffer 765 as reference MVs for producing predicted MVs.

The in-loop filter 745 performs filtering or smoothing operations on the decoded pixel data 717 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 8:
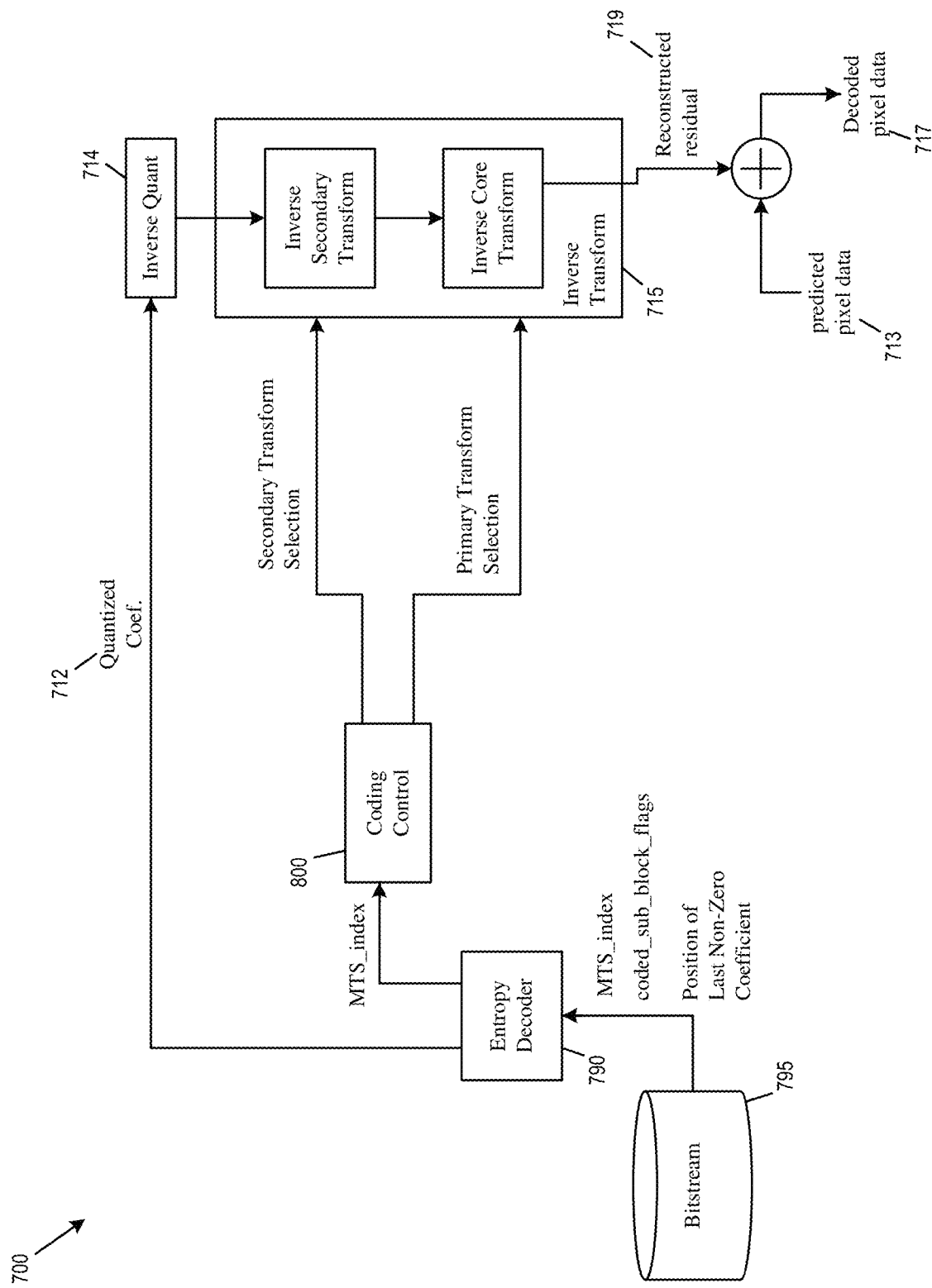
FIG. 8 illustrates portions of the decoder that implements MTS by selectively enabling transform operations.

FIG. 8 illustrates portions of the decoder 700 that implements multiple transform selection (MTS) by selectively enabling transform operations. As illustrated, for each block of pixels, the decoder 700 determines whether to perform a particular type of secondary transform, whether to perform a particular type of primary transform (e.g., DCT-II), whether to enable MTS, and/or which transforms to use as horizontal transform and vertical transform for MTS. The decoder also determines the signaling for MTS in the bitstream 795.

As illustrated, the decoder 700 selects a primary transform and/or a secondary transform for the inverse transform module 715, and the inverse transform module 715 performs corresponding inverse primary transform and/or inverse secondary transform. The selected primary transform may implement MTS by including a horizontal transform and a vertical transform.

The decoder 700 includes a coding control module 800. The coding control module 800 determines the selection of the primary transform and/or the secondary transform, and if MTS is to be used, which transforms are to be used as horizontal and vertical transforms. The coding control module 800 may map the MTS index provided by the entropy decoder 790 to a selection of the corresponding horizontal and vertical transforms.

The entropy decoder 790 parses the bitstream 795 to determine the value of MTS index. The bitstream may include syntax elements that indicate which subblocks of the current block has non-zero coefficients (e.g., coded_sub_block_flag), or/and syntax elements that identify the position of the last non-zero coefficient in the current block. Based on these syntax elements, the entropy decoder may determine whether to parse the bitstream for MTS index. Specifically, the entropy decoder 790 may bypass or skip parsing the bitstream for MTS index if the position of the last non-zero coefficient in the current block indicates that there is a non-zero coefficient beyond a particular subblock in diagonal scan order (e.g., LastSignificantCoeffX>15 or LastSignificantCoeffY>15), or if the non-zero coefficient indications indicate that there are non-zero coefficients in a zero-out region defined by subblock positions beyond a vertical threshold position or a horizontal threshold position (e.g., region 300 of FIG. 3 defined by xS>3 or yS>3). If the entropy decoder 790 does not parse the bitstream for MTS index, the entropy decoder 790 sets the value of MTS index to zero for the coding control module 800.

Figure 9:
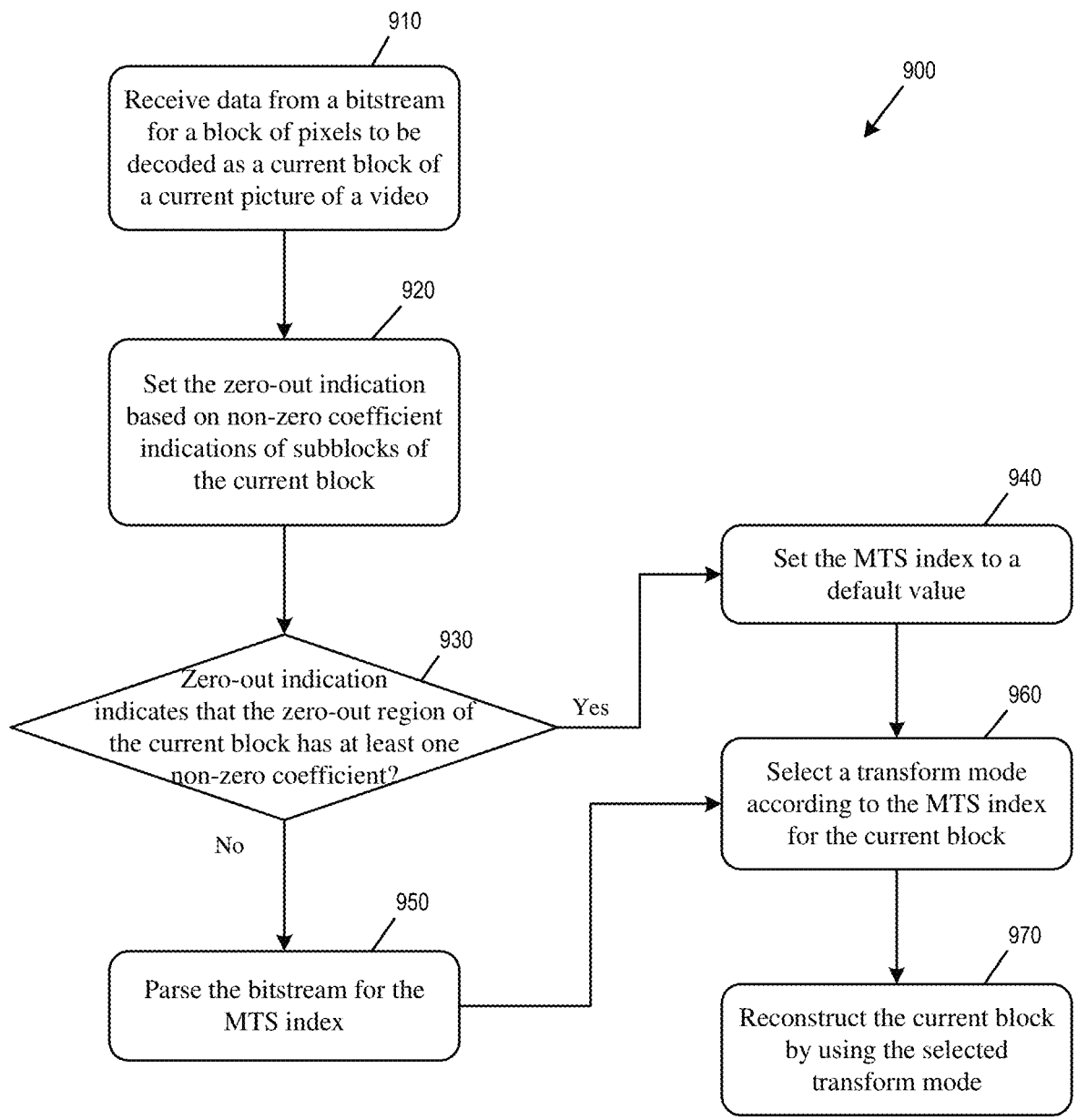
FIG. 9 conceptually illustrates a process for using multiple transform selection to decode a block of pixels.

FIG. 9 conceptually illustrates a process 900 for using multiple transform selection to decode a block of pixels. In some embodiments, one or more processing units (e.g., a processor) of a computing device implements the decoder 700 performs the process 900 by executing instructions stored in a computer readable medium. In some embodiments, an electronic apparatus implementing the decoder 700 performs the process 900.

The decoder receives (at block 910) data from a bitstream for a block of pixels to be decoded as a current block of a current picture of a video.

The decoder sets (at block 920) the zero-out indication (e.g., MtsZeroOutSigCoeffFlag) based on non-zero coefficient indications (e.g., coded_sub_block_flag) of subblocks of the current block (e.g., region 300 of FIG. 3 defined by xS>3 or yS>3). In some embodiments, the zero-out region of the current block is a region of each transform block in the current block that is beyond a vertical threshold position or a horizontal threshold position (e.g., xS>3 or yS>3). The horizontal threshold position and the vertical threshold position are positions (xS, yS) of coding groups in the current transform block (or named the subblock at location (xS, yS) within the current transform block). For example, the subblock includes 16 transform coefficients. In other words, the subblock includes 4×4 transform coefficients. In some embodiments, the decoder examines the non-zero coefficient indications of the subblocks to see if any subblocks in the zero-out region of the current block has non-zero coefficient. If so, the decoder sets the zero-out indication to indicate there is at least one non-zero coefficient in the zero-out region of the current block. The process proceeds to 940.

The decoder determines (at block 930) whether the zero-out indication indicates that the zero-out region of the current block has at least one non-zero coefficient. If so, the process proceeds to 940. If the zero-out indication indicate that the zero-out region of the current block has no non-zero coefficient (if other MTS signaling conditions are also satisfied), the decoder parses (at block 950) the bitstream for the MTS index and the process proceeds to 960.

At block 940, the decoder sets the MTS index to a default value without parsing the MTS index from the bitstream. The decoder selects (at block 960) the transform mode according to the MTS index for the current block. In some embodiments, the transform mode specifies horizontal and vertical transforms of an associated luma transform blocks in the current block. In some embodiments, the default value of the MTS index correspond to the transform mode that uses Discrete Cosine Transform Type II (DCT-2) for both horizontal and vertical transforms. The decoder reconstructs (at block 970) the current block by using the selected transform mode.

In some embodiments, an encoder may signal (or generate) one or more syntax element in a bitstream, such that a decoder may parse said one or more syntax element from the bitstream.

IV. Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 10:
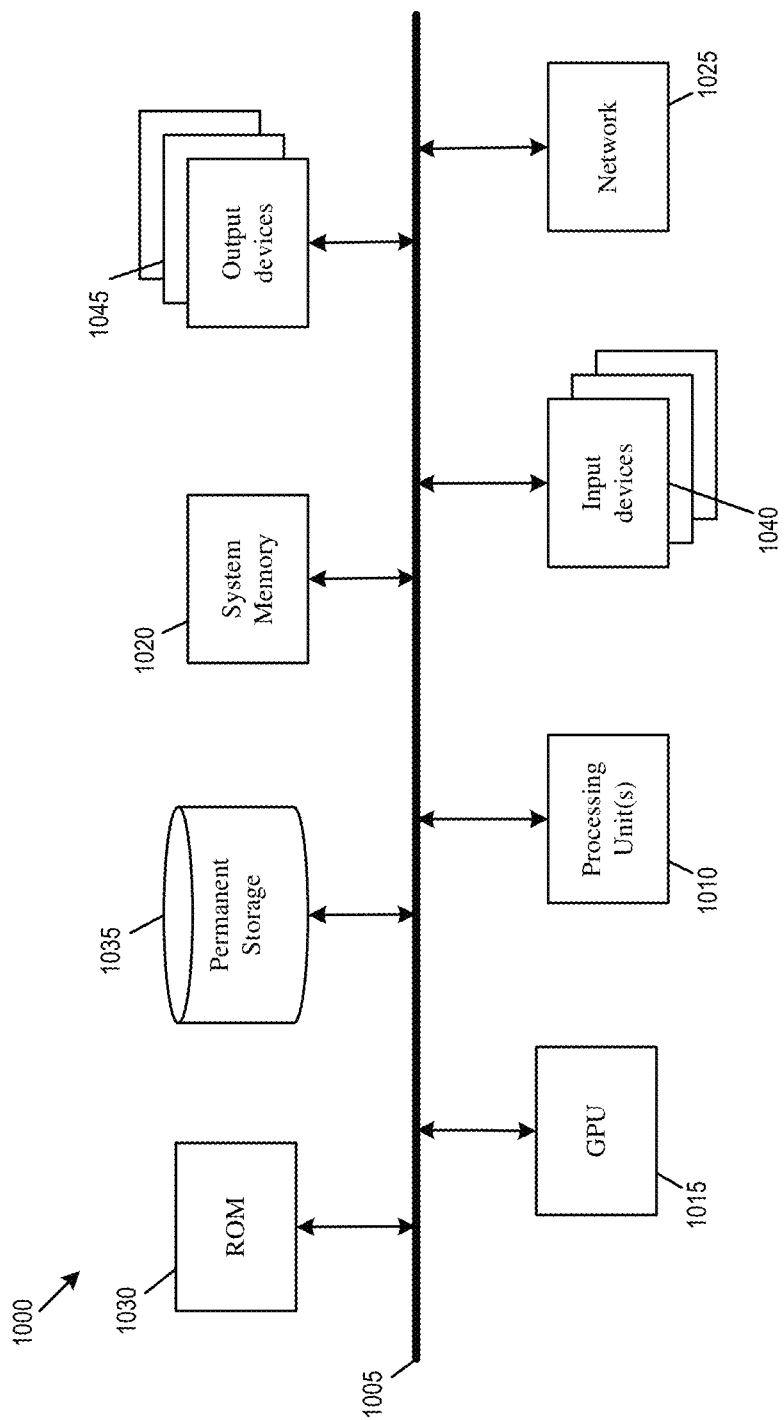
FIG. 10 conceptually illustrates an electronic system with which some embodiments of the present disclosure are implemented.

FIG. 10 conceptually illustrates an electronic system 1000 with which some embodiments of the present disclosure are implemented. The electronic system 1000 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1000 includes a bus 1005, processing unit(s) 1010, a graphics-processing unit (GPU) 1015, a system memory 1020, a network 1025, a read-only memory 1030, a permanent storage device 1035, input devices 1040, and output devices 1045.

The bus 1005 collectively represents all system, peripheral, and chipset buses that communicatively connect the numerous internal devices of the electronic system 1000. For instance, the bus 1005 communicatively connects the processing unit(s) 1010 with the GPU 1015, the read-only memory 1030, the system memory 1020, and the permanent storage device 1035.

From these various memory units, the processing unit(s) 1010 retrieves instructions to execute and data to process in order to execute the processes of the present disclosure. The processing unit(s) may be a single processor or a multi-core processor in different embodiments. Some instructions are passed to and executed by the GPU 1015. The GPU 1015 can offload various computations or complement the image processing provided by the processing unit(s) 1010.

The read-only-memory (ROM) 1030 stores static data and instructions that are used by the processing unit(s) 1010 and other modules of the electronic system. The permanent storage device 1035, on the other hand, is a read-and-write memory device. This device is a non-volatile memory unit that stores instructions and data even when the electronic system 1000 is off. Some embodiments of the present disclosure use a mass-storage device (such as a magnetic or optical disk and its corresponding disk drive) as the permanent storage device 1035.

Other embodiments use a removable storage device (such as a floppy disk, flash memory device, etc., and its corresponding disk drive) as the permanent storage device. Like the permanent storage device 1035, the system memory 1020 is a read-and-write memory device. However, unlike storage device 1035, the system memory 1020 is a volatile read-and-write memory, such a random access memory. The system memory 1020 stores some of the instructions and data that the processor uses at runtime. In some embodiments, processes in accordance with the present disclosure are stored in the system memory 1020, the permanent storage device 1035, and/or the read-only memory 1030. For example, the various memory units include instructions for processing multimedia clips in accordance with some embodiments. From these various memory units, the processing unit(s) 1010 retrieves instructions to execute and data to process in order to execute the processes of some embodiments.

The bus 1005 also connects to the input and output devices 1040 and 1045. The input devices 1040 enable the user to communicate information and select commands to the electronic system. The input devices 1040 include alpha-numeric keyboards and pointing devices (also called "cursor control devices"), cameras (e.g., webcams), microphones or similar devices for receiving voice commands, etc. The output devices 1045 display images generated by the electronic system or otherwise output data. The output devices 1045 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 10, bus 1005 also couples electronic system 1000 to a network 1025 through a network adapter (not shown). In this manner, the computer can be a part of a network of computers (such as a local area network ("LAN"), a wide area network ("WAN"), or an Intranet, or a network of networks, such as the Internet. Any or all components of electronic system 1000 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIG. 6 and FIG. 9) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A video decoding method, comprising:
    receiving data from a bitstream for a block of pixels to be decoded as a current block of a current picture of a video;
    setting a zero-out indication based on one or more non-zero coefficient indications of subblocks of the current block;
    when the zero-out indication indicates that a zero-out region has no non-zero coefficient, parsing the bitstream for a multiple transform selection (MTS) index;
    when the zero-out indication indicates that the zero-out region has at least one non-zero coefficient, setting the MTS index to a default value without parsing the MTS index from the bitstream;

selecting a transform mode according to the MTS index for the current block; and reconstructing the current block by using the selected transform mode.

2. The video decoding method of claim 1, wherein one or more non-zero coefficient indications of subblocks are used to indicate whether the subblocks of the current block, located at the zero-out region of the current block, has one or more non-zero coefficients.

3. The video decoding method of claim 1, wherein the transform mode specifies horizontal and vertical transforms of an associated luma transform blocks in the current block.

4. The video decoding method of claim 1, wherein the zero-out region of the current block is a region of the current block defined by the subblock positions beyond a vertical threshold position or a horizontal threshold position.

5. The video decoding method of claim 4, wherein the horizontal threshold position and the vertical threshold position are positions of subblocks.

6. The video decoding method of claim 1, wherein the default value correspond to a transform mode that uses Discrete Cosine Transform Type II (DCT-2) for both horizontal and vertical transforms.

7. The video decoding method of claim 1, wherein low-frequency non-separable transform (LFNST) is disabled for the current block.

8. A video encoding method, comprising:

receiving data for a block of pixels to be encoded as a current block of a current picture of a video into a bitstream;

setting a zero-out indication based on one or more non-zero coefficient indications of subblocks of the current block;

when the zero-out indication indicates that a zero-out region has no non-zero coefficient, signaling a multiple transform selection (MTS) index in the bitstream;

when the zero-out indication indicates that the zero-out region has at least one non-zero coefficient, setting the MTS index to a default value without signaling the MTS index in the bitstream;

selecting a transform mode according to the MTS index for the current block; and encoding the current block into the bitstream by using the selected transform mode.

9. An electronic apparatus, comprising:

a video decoder circuit configured to perform operations comprising:

receiving data from a bitstream for a block of pixels to be decoded as a current block of a current picture of a video;

setting a zero-out indication based on one or more non-zero coefficient indications of subblocks of the current block;

when the zero-out indication indicates that a zero-out region has no non-zero coefficient, parsing the bitstream for a multiple transform selection (MTS) index;

when the zero-out indication indicates that the zero-out region has at least one non-zero coefficient, setting the MTS index to a default value without parsing the MTS index from the bitstream;

selecting a transform mode according to the MTS index for the current block; and reconstructing the current block by using the selected transform mode.

* * * * *